US007952467B2

(12) United States Patent
Hardacker et al.

(10) Patent No.: US 7,952,467 B2
(45) Date of Patent: May 31, 2011

(54) SYSTEM AND METHOD FOR INFORMING USER HOW TO USE UNIVERSAL REMOTE CONTROL

(75) Inventors: Robert Hardacker, Escondido, CA (US); Thomas Patrick Dawson, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1045 days.

(21) Appl. No.: 11/541,272

(22) Filed: Sep. 29, 2006

(65) Prior Publication Data

US 2008/0088474 A1 Apr. 17, 2008

(51) Int. Cl.
*G06F 13/42* (2006.01)
*H04L 1/00* (2006.01)
*H04B 1/20* (2006.01)
*G05B 19/02* (2006.01)

(52) U.S. Cl. ............... 340/12.22; 340/13.24; 340/13.25; 340/12.3; 340/12.23

(58) Field of Classification Search .................. 340/825, 340/825.69, 572.1
See application file for complete search history.

(56) References Cited

U.S. PATENT DOCUMENTS

| | | | | |
|---|---|---|---|---|
| 7,116,229 | B1 * | 10/2006 | Miramontes | 340/572.1 |
| 2003/0110512 | A1 | 6/2003 | Maari | 725/131 |
| 2003/0130906 | A1 | 7/2003 | Maari | 705/26 |
| 2004/0066308 | A1 * | 4/2004 | Sampsell | 340/825.69 |
| 2004/0070491 | A1 * | 4/2004 | Huang et al. | 340/10.5 |
| 2004/0070497 | A1 * | 4/2004 | Laurosch et al. | 340/522 |
| 2004/0073451 | A1 | 4/2004 | Maari | 705/1 |
| 2004/0107167 | A1 | 6/2004 | Maari | 705/57 |
| 2005/0015467 | A1 | 1/2005 | Noda | 709/220 |
| 2005/0024226 | A1 | 2/2005 | Hayes et al. | 340/825.22 |
| 2005/0273181 | A1 * | 12/2005 | Peng et al. | 700/14 |
| 2006/0197676 | A1 * | 9/2006 | Smith | 340/825.69 |
| 2006/0252030 | A1 * | 11/2006 | In-Jae et al. | 435/5 |
| 2007/0024463 | A1 * | 2/2007 | Hall et al. | 340/825.69 |
| 2007/0126576 | A1 * | 6/2007 | Script et al. | 340/545.5 |

FOREIGN PATENT DOCUMENTS

| | | |
|---|---|---|
| WO | WO 01/71685 | 9/2001 |
| WO | WO 01/71685 A1 | 9/2001 |

OTHER PUBLICATIONS

Robert Hardacker, Rolf Toft, Ryuichi Iwarmura,"System and Method for Application Dependent Universal Remote Control", File History of pending U.S. Appl. No. 11/970,858.

Robert Hardacker, "System and Method for Application Dependent Universal Remote Control", File History of pending U.S. Appl. No. 11/726,560.

Paul Doyle, "Non-Programmable Universal Remote System and Method", File History of pending U.S. Appl. No. 12/365,274.

Bob O'Donnell, "HDMITM: the Digital Display Link", http://www.hdmi.com/pdf/whitepaper/SilicaonImageHDMIWhitePaperv73(2).pdf, Dec. 2006.

(Continued)

*Primary Examiner* — Daniel Wu
*Assistant Examiner* — Pameshanand Mahase
(74) *Attorney, Agent, or Firm* — John L. Rogitz

(57) ABSTRACT

Control information is exchanged between a component and a remote control device using RFID and then transmitted to a TV using RFID so that the TV can display components to be controlled and/or remote control device buttons and/or functions of remote control device buttons for particular components to be controlled, to train the user.

15 Claims, 3 Drawing Sheets

OTHER PUBLICATIONS

Joseph L. Lias, "HDMI Consumer Electronic Control (CEC) Technology and Testing", http://www.vidsignline.com/howto/207400325;jsessionid=TANMBENIIC4AIQSNDLRCHH0CJUNN2JVN?pgno=2, Apr. 18, 2008.

Logitech Harmony Advanced Universal Remote 720 brochure.

Logitech Products web page for Harmony Remote Control, www.logitech.com/index.cfm.products/features/harmonytopics/US/en,CRID=2079, printed Feb. 23, 2007.

* cited by examiner

SYSTEM AND METHOD FOR INFORMING USER HOW TO USE UNIVERSAL REMOTE CONTROL

FIELD OF THE INVENTION

The present invention relates generally to systems and methods for informing users how to use universal remote controls.

BACKGROUND OF THE INVENTION

In an effort to resolve the burden on users from possessing a confusing number of remote control devices, e.g., one each for a TV, a personal video recorder (PVR), a digital video disk (DVD) player, a set-top box (STB), etc., so-called universal remote controls have been provided to operate all of the components a user might have in a home network. As understood herein, different buttons on the remote can assume different functions depending on which component the user has selected for control, making it difficult for the user to know or remember which button performs which particular function for any given component. With this recognition in mind, the invention herein is provided.

SUMMARY OF THE INVENTION

RFID, Radio Frequency Identification, typically refers to a technology consisting of two basic components: an active Reader and/or Writer and a passive component device, herein referred to as a tag and more generically as a "RFID device". A Reader/Writer transmits a wireless signal to the tag. The RFID tag "harvests" energy contained in the transmission to power its circuitry enabling the RFID tag to respond to the Reader/Writer.

A remote control device has an associated remote RFID reader/writer and a TV has an associated TV RFID device. Also, one or more components such as PVRs, DVDs, and STBs has an associated component RFID device. The remote control RFID reader/writer can be positioned to receive information from the component RFID device pertaining to functions of buttons on the remote control device for controlling the component. As envisioned in this aspect, the remote RFID reader/writer can be positioned to send the information to the TV RFID component, with the TV presenting at least one display representing components to be controlled and/or remote control device buttons and/or functions of remote control device buttons. The user may navigate the buttons on the on-screen graphic of the remote controller. As the user navigates, a context sensitive textual description indicates what the button does.

The remote control device can also communicate commands to the TV and/or STB conventionally, e.g., via IR. In one alternate embodiment the remote control device has only pointing and clicking capability, with a user being able to select a button by means of the remote control device to thereby cause execution in the TV and/or component of a function represented by the button.

In yet another aspect, a remote control device has a portable housing, a command transmitter on the housing and configured to send commands to a TV, and a RFID reader/writer in the housing and configured to transfer information using RFID.

In another aspect, a television display presents a graphic depiction of a portable remote control device that presents to the user an illustrated context sensitive guide to the operation of the remote control device for each of a controlled component selected by the user.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
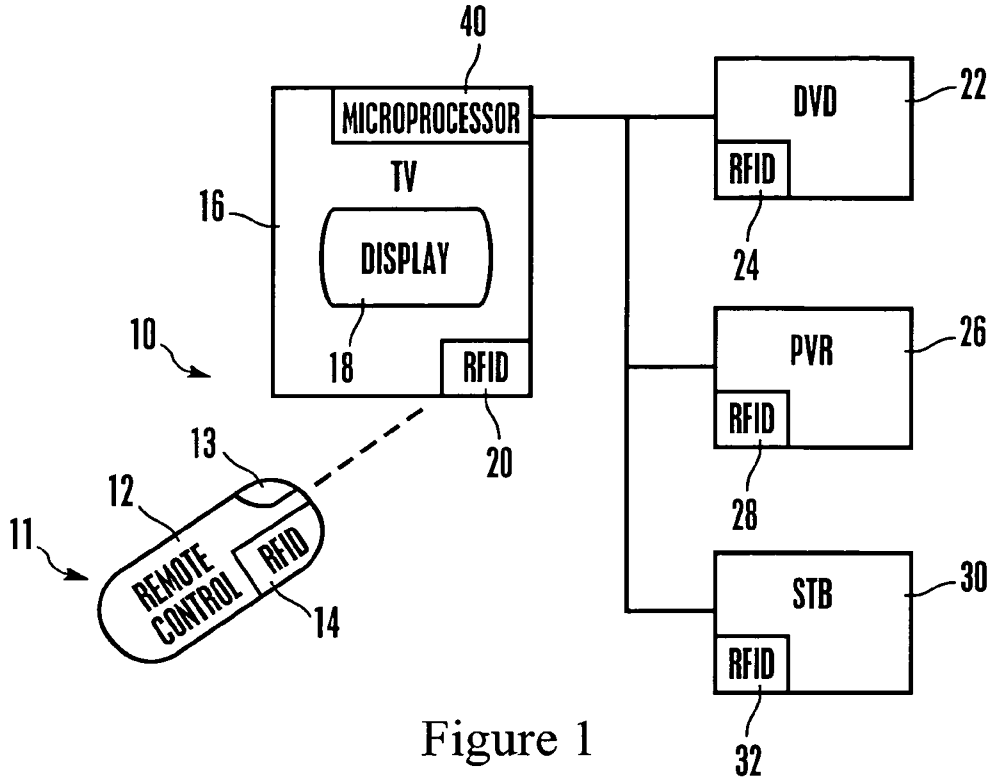
FIG. 1 is a block diagram of a non-limiting system of the present invention.

Referring initially to FIG. 1, a system is shown, generally designated 10, which includes a portable hand-held housing 11 embodying a remote control device 12 having, in the preferred embodiment shown, an RF and/or IR transmitter 13 for sending remote commands in accordance with principles known in the art and also having a relatively shorter range radiofrequency identifier (RFID) device 14 for communicating in accordance with RFID principles known in the art. Preferably, the device 14 is a RFID reader/writer. Thus, the remote control may communicate using RFID and may also communicate via another RF band or via infrared with a TV 16 having a display 18 that can display the screen shots shown below in FIGS. 2-4. The TV 16 may also have an RFID device 20, preferably a reader/writer but in some implementations a RFID tag, mounted on it.

Additional components may be controlled by the remote control device 12, including, by way of non-limiting example, a DVD player 22 with associated RFID device 24, a personal video recorder (PVR) 26 with associated RFID device 28, and a STB 30 with associated RFID device 32, all of which components can communicate with the TV via wired or wireless links. The location of each RFID device on its respective component may be visually indicated by, e.g., lines or other markings.

The component RFID devices can be a so-called Felica device or Near Field Communications (NFC) devices. An NFC or a Felica device when used in accordance with the present invention has a microprocessor and non-volatile memory (NVM) typically embodied in a Smart Card. The component RFID devices 24, 28, 32 may be implemented by RFID tags embodied as tokens resembling a small disk and/or integrated circuit that are unpowered. In less preferred embodiments the component RFID devices can be RFID reader/writers. In any case, when the RFID devices are tags as opposed to reader/writers, placing a component RFID device (including an NFC device with chip and antenna or Felica device) close (e.g., within an inch or so) to the RFID reader/ writer 14 of the remote control 12 energizes the Felica Card, token, or chip. It can then be read and/or written to by the RFID reader/writer. 14.

The information in the NVM of the components 22, 26, 30 can thus be transferred to the remote control 12. As set forth further below, the information can be used to reprogram the functionality of the remote control 12.

Thus, it is to be appreciated that the remote control 12 can have a RFID reader/writer and the component RFID devices, as well as the TV RFID device, are RFID tags. Or, both the remote control RFID device and TV RFID device can be RFID reader/writers and the component RFID devices can be RFID tags. Thus, depending on the particular types of RFID devices (reader/writers or simple tags) selected, the component can be positioned close to the TV to effect RFID exchange or the RFID exchange can be effected between component and TV using the remote control 12 as intermediary.

In an alternate implementation the information can be conveyed from the remote control 12 to the TV 16. As understood herein, the TV 16 has more processing power than the remote control 12, so that the TV 16 can reprogram the remote control 12 to account for newer components that are not in database of the remote control 12. This new functionality may be conveyed to the TV in one of two ways. The remote control 12 can write information read from the RFID device of the component to the NVM of the TV 16. Or, information can be exchanged between the RFID reader/writer 20 of the TV and the RFID reader/writer 14 of the remote control 12. Still another alternative is to take the component such as the STB 30 directly to the TV 16 and allow the TV RFID reader/writer 20 to read the STB NVM by means of the STB RFID device 32, then allow the TV to update the remote control 12.

Thus, as contemplated herein, a user can touch (or closely juxtapose) the RFID reader/writer 14 on the remote control 12 with each RFID device on the components 22, 26, and 30 in succession, potentially aided by the visual indications disclosed above, to cause information in each successive component to automatically be read by the remote control 12. The information can include functions of various buttons on the remote control 12 pertaining to that component, along with, if desired, signaling methods. This download is done using RFID information exchange principles known in the art, automatically once the RFID devices are close enough to each other to trigger information exchange. Then, the user can touch (or closely juxtapose) the RFID device 14 on the remote control 12 with the RFID device 20 on the TV 16 to transfer the information from the components 22, 26, 30 to the TV.

Figure 2:
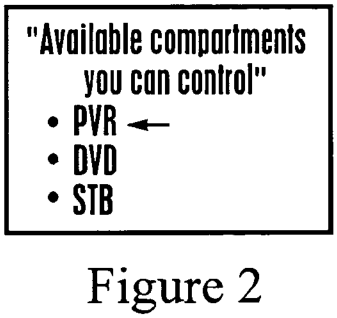
FIG. 2 is a screen shot of a high level non-limiting training display, showing the components that may be controlled by the remote control.
Figure 3:
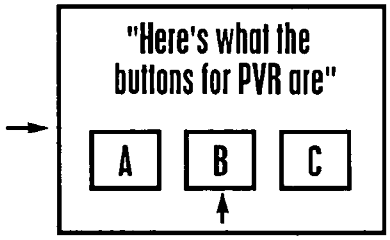
FIG. 3 is a screen shot of a lower level non-limiting training display, showing the available control buttons for the component selected from FIG. 2.
Figure 4:
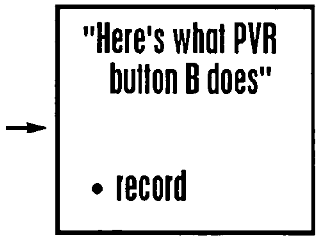
FIG. 4 is a screen shot of a lowest level non-limiting training display, showing the function of the control button selected from FIG. 3.

Subsequently, upon a predetermined event, e.g., the user pressing a "menu" button on the remote control 12 or upon initial energization or some other event, the TV 12 can display the non-limiting screen shot shown in FIG. 2, which lists the components that are available for control. The user can manipulate the cursor buttons on the remote control 12 to select one of the components, e.g., "PVR", in which case a second level screen appears as shown in FIG. 3, presenting a display of the buttons on the remote control 12 that are active for the selected component. If the user selects a button, e.g., button "B" by, e.g., moving the screen cursor over the button, another screen shot, that shown in FIG. 4, appears in which the function of the selected button for the selected component is explained or shown or otherwise identified.

Figure 5:
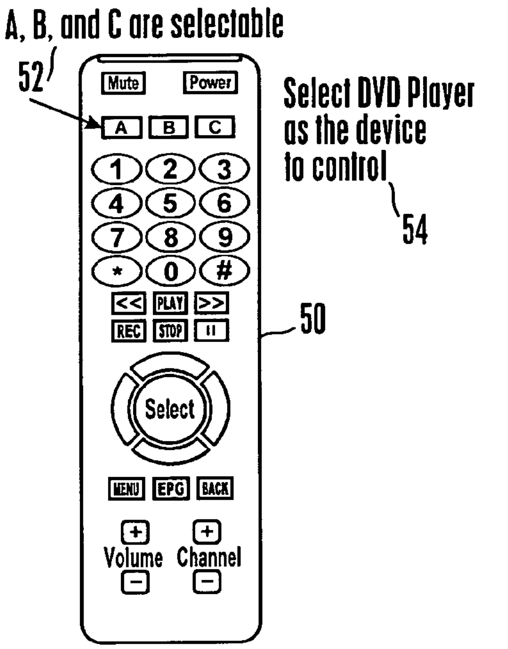
FIGS. 5-10 show various TV screen displays of the remote to aid the user in learning the correlation between remote control buttons and device-specific functions.

FIGS. 5-10 further illustrate the displays that can be presented once the TV has "learned" the components as described above. FIG. 5 shows a non-limiting image 50 of the remote 12. The image 50 is displayed on the display 18 of the TV 16. A user can scroll over or otherwise select a component button 52, in the case shown, a "DVD" button. This causes a context-sensitive message 54 to be displayed on the TV, e.g., "select DVD player as the device to control."

Figure 6:
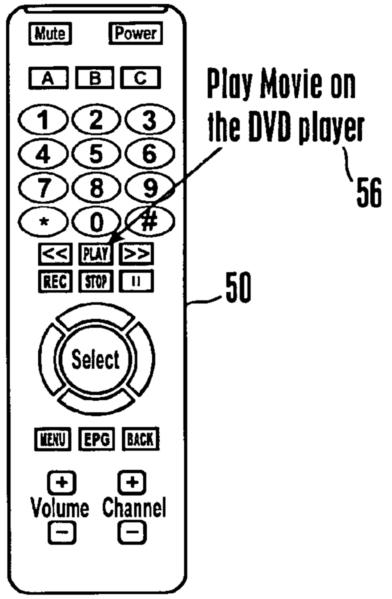

As indicated in FIG. 6, the user can then manipulate the buttons on the remote 12 to move a screen cursor over a button on the image 50. An ensuing alpha-numeric message or explanation 56 appears in response on the screen as shown. This message or explanation of the selected button can be context sensitive for the selections the user has made.

Figure 7:
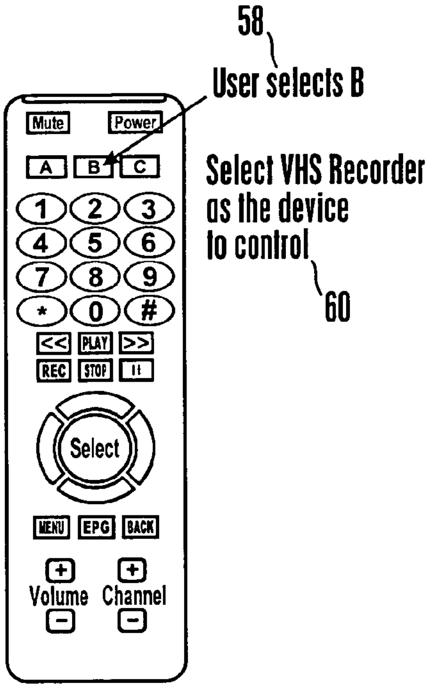
Figure 8:
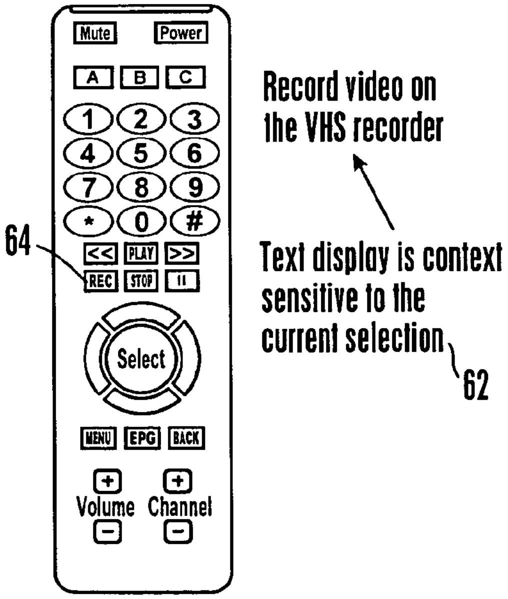
Figure 9:
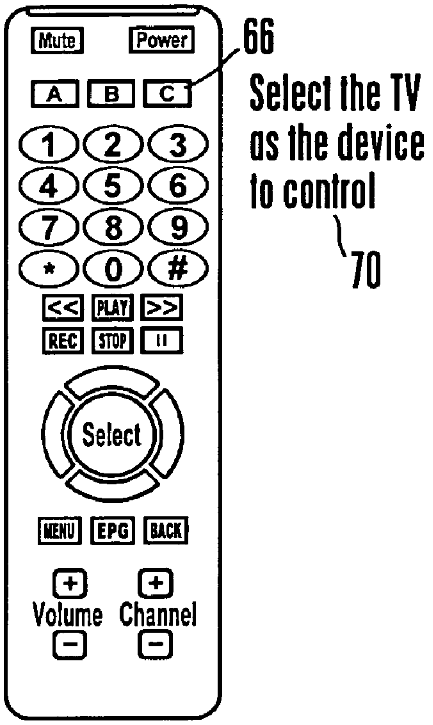
Figure 10:
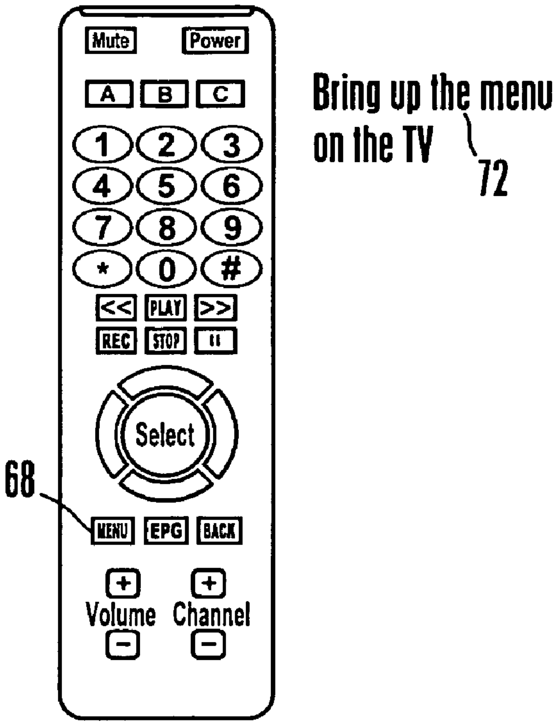

FIGS. 7 and 8 show that the user may alternatively select another button 58 which in this example is set to a VHS recorder, with ensuing button descriptions 60, 62 being displayed accordingly (in FIG. 8, the user has hovered the cursor over or otherwise selected the "record" button 64 on the image 50 of the remote 12). As the navigates around the image 50, the text descriptions are relative to the current selection. The default selection can if desired match the mode the remote is in when the graphic is initiated. FIGS. 9 and 10 show that the user may select a TV component button 66 and then a menu button 68 to cause the messages 70, 72 to be respectively shown.

Alternatively, both the image 50 and descriptions for all buttons for a given component can be displayed at once on the screen, so the user need not hover over or otherwise select any given button for explanation. Such a consolidated image with button-by-button text explanation can be accessible via the User Menu (Cross Media Bar, Wega-Gate, etc.) under, e.g., the "Setup" function and then the "remote" sub-function to essentially display user's manual information. When "new" functions are read by the remote 12 and then conveyed to the TV as described, the above-mentioned text can be changed to add a description of the "new" buttons, e.g., how they work, for instance, for the STB. For example, MENU: for DVD, press to display Page ¼; for TV no function; F1/F2: for DVD, F1=DVD F1 function, F2 has no function, etc.

The screen shots above may be separate from each other or may be overlaid one on top of another as they are selected, or otherwise displayed conveniently for the user. The logic above may be executed at least in part by a processor 40 in the TV 16.

In another embodiment, the remote control 12 has only pointing and clicking capability, in addition to the RFID information exchange capability and IR command transmission capability. In other words, the remote control device in this embodiment has no keypad or buttons other than a select button and perhaps cursor control keys. In this embodiment, information is exchanged as above using RFID but the control buttons displayed on the TV are selectable by means of the remote control 12 to actually execute their respective functions by, e.g., sending command signals over IR or other link from the TV to the respective component being controlled, perhaps relayed through the remote control 12.

Thus, in one implementation all the normal remote functionality of the remote can be suspended while in the graphic mode, such that pressing all but one or two selected buttons on the remote will bring up text on the TV monitor describing the pressed button's function. One or two selected buttons can be used to bring up a "test" mode as well as a pop up menu asking if the user wishes to exit the description graphic and go back to normal operation of the remote controller.

On the other hand, in another implementation when in the graphic mode of the remote the user can navigate around the image of the remote commander that is displayed on the TV by using the up, down, left right arrow keys, with an on-screen highlight tracking the cursor position on the graphic. As a button on the displayed image is highlighted the text describing that button appears.

Yet again, pressing the “SELECT” button (sometimes called “OK” or “ENTER”) on the remote can cause the text for an item to appear. In this embodiment the normal operation of the remote controller is not affected. An on screen selection allows the user to exit the graphic mode.

Thus, the present remote control can be a remote control with buttons and the images on the TV map new functions to the buttons based on signals received from the above-described RFID exchange. Or, the remote control can have few if any buttons, and the TV can display “virtual buttons” which are selected using what few buttons exist on the remote control, e.g., up, down, left, right, enter. In this case the RFID information exchange in effect adds new “virtual buttons” to the display.

While the particular SYSTEM AND METHOD FOR INFORMING USER HOW TO USE UNIVERSAL REMOTE CONTROL is herein shown and described in detail, it is to be understood that the subject matter which is encompassed by the present invention is limited only by the claims.

What is claimed is:

1. A system comprising:

at least one TV having an associated TV RFID tag device;

at least one remote control device having an associated remote RFID reader/writer device; and wherein the remote RFID reader/writer device is positionable to receive information from a component RFID tag device pertaining to functions of buttons on the remote control device for controlling a component associated with the component RFID tag device, and wherein the remote RFID reader/writer device is positionable to send the information to the TV RFID tag device, the TV using the information to present at least one display representing components to be controlled and/or remote control device buttons and/or functions of remote control device buttons, wherein the remote control device has only pointing and clicking capability and no keypad that makes a selection from the presented at least one display to control the component.

2. The system of claim 1, comprising plural components with respective RFID devices.

3. The system of claim 1, wherein the component is selected from the group consisting of PVRs, DVDs, STBs.

4. The system of claim 1, wherein the remote control device communicates commands to the TV via IR.

5. The system of claim 1, wherein a user is being able to select a button displayed on the TV by means of the remote control device to thereby cause execution in the TV and/or component of a function represented by the button.

6. A method comprising:

reading control information from a component having a component RFID tag device using a remote control device having an RFID reader/writer device;

transmitting the information to a TV having a TV RFID tag device from the remote control device using the remote control RFID reader/writer device; and presenting at least one user interface on the TV at least partially based on the information received at the TV RFID tag device, the user interface including textual information describing a function of at least one control key associated with controlling the component; and wherein the at least one user interface includes at least one display representing components to be controlled and/or remote control device buttons and/or functions of remote control device buttons;

wherein the remote control device makes a selection from the at least one display to control the component.

7. The method of claim 6, comprising sending, via RFID, control information from plural components with respective RFID devices to the remote control device.

8. The method of claim 6, wherein the component is selected from the group consisting of PVRs, DVDs, STBs.

9. The method of claim 6, wherein the remote control device communicates commands to the TV via IR.

10. The method of claim 6, wherein the remote control device has only pointing and clicking ability, a user being able to select a button displayed on the TV by means of the remote control device to thereby cause execution in the TV and/or component of a function represented by the button.

11. A remote control device, comprising:

a portable housing;

at least one command transmitter on the housing and configured to send commands to a TV having a TV RFID tag device; and at least one RFID reader/writer device on the housing and configured to transfer information using RFID, wherein images of control keys of a component to be controlled being displayed on the TV and being selectable by manipulating the remote control device to execute respective functions associated with the images of the control keys to control the component being controlled;

wherein the RFID reader/writer device on the housing receives control information from a component RFID tag device of a component; and transmits the control information to the TV RFID tag device, the display being presented on the TV at least partially based on the control information received at the TV RFID tag device.

12. The remote control device of claim 11, wherein the display includes at least one display representing components to be controlled and/or remote control device buttons and/or functions of remote control device buttons.

13. The remote control device of claim 11, wherein the RFID device on the housing receives, via RFID, control information from plural components.

14. The remote control device of claim 11, wherein the component is selected from the group consisting of PVRs, DVDs, STBs.

15. The remote control device of claim 11 wherein, the remote control device has only pointing and clicking capability, a user being able to select a button displayed on the TV by means of the remote control device to thereby cause execution in the TV and/or component of a function represented by the button.

* * * * *